United States Patent [19]

Hunter et al.

[11] Patent Number: 4,615,899

[45] Date of Patent: Oct. 7, 1986

[54] SAUCE CONTAINING ACIDIFIED TEXTURED PROTEIN

[75] Inventors: John E. Hunter; Albert M. Ehrman, both of Cincinnati, Ohio

[73] Assignee: The Procter & Gamble Co., Cincinnati, Ohio

[21] Appl. No.: 679,856

[22] Filed: Dec. 10, 1984

[51] Int. Cl.⁴ .......................... A23L 1/39; A23L 3/34
[52] U.S. Cl. ................................... 426/589; 426/104; 426/574; 426/656; 426/802; 426/331
[58] Field of Search .............. 426/589, 652, 574, 656, 426/104, 802, 331

[56] References Cited

U.S. PATENT DOCUMENTS

| | | | |
|---|---|---|---|
| 2,730,448 | 1/1956 | Boyer et al. | 426/656 |
| 3,142,571 | 7/1964 | McAnelly | 426/656 |
| 3,454,406 | 7/1969 | Alderton | 426/521 |
| 3,736,148 | 5/1973 | Katz | 426/104 |
| 3,800,053 | 3/1974 | Lange | 426/364 |
| 3,870,805 | 3/1975 | Hayes et al. | 426/104 |
| 3,886,296 | 5/1975 | Brooks et al. | 426/325 |
| 3,925,566 | 12/1975 | Reinhart et al. | 426/802 |
| 3,953,611 | 4/1976 | Youngquist | 426/104 |
| 3,962,335 | 6/1976 | Kumar | 426/656 |
| 4,125,630 | 11/1978 | Orthoefer | 426/104 |
| 4,132,809 | 1/1979 | Desrosier | 426/104 |
| 4,230,738 | 10/1980 | Shemer et al. | 426/656 |
| 4,447,461 | 5/1984 | Loos et al. | 426/589 |

FOREIGN PATENT DOCUMENTS 1503420 9/1978 United Kingdom ............... 426/104

OTHER PUBLICATIONS

Powers, J. J., "Effect of Acidification of Canned Tomatoes on Quality and Shelf Life", Critical Reviews in Food Science & Nutrition, pp. 371-396, Jun. 1976.
Gould, W. A., Tomato Production, Processing & Quality Evaluation, AVI Pub. Co., Inc., Westport, CT, pp. 334-346 (1974).
Sognefest, P., and Jackson, J. M., "Pre-Sterilization of Canned Tomato Juice", Food Technology, vol. 1, No. 1, pp. 78-84 (1947).
21 C.F.R., §113, 114, §114.90.

Primary Examiner—Jeanette Hunter
Attorney, Agent, or Firm—Richard C. Witte; Rose Ann Dabek; Edmund F. Gebhardt

[57] ABSTRACT

This invention relates to a shelf-stable sauce containing acidified texture protein. Protein extrudate is acidified and the acid is then removed to minimize added anion levels in the protein without materially, affecting its lowered pH. The acidified extrudate is then mixed with a binder and heatset to form an analog, the analog is mixed with sauce and the pH of sauce and meat analog equilibrated to less than 4.6 within 48 hours.

18 Claims, No Drawings

SAUCE CONTAINING ACIDIFIED TEXTURED PROTEIN

TECHNICAL FIELD

This invention relates to an acidification process for textured protein. This invention further relates to the acidified extrudate, analog, or sauce products prepared by this process.

BACKGROUND OF THE INVENTION

The Federal Regulations of the Food and Drug Administration permit canners of foods to acidify their products to a pH of 4.6 or below as an alternative to thermal retort sterilization. By acidification of such products to a pH of 4.6 or below, the products are rendered microbiologically safe if the products are sealed into containers at elevated temperatures, and held for a sufficient time to destroy molds, yeasts, and vegetative bacteria prior to cooling. Most acidified foods are kept at a pH well below 4.6, because above about 4.2, growth of *Bacillus coagulans* occurs, causing flat sour spoilage of the product. Acidification permits use of less severe processing conditions without sacrificing product safety.

Several techniques for acidification are used by processors of acidified food. These include (1) blanching of the food ingredients in acidified aqueous solutions; (2) immersion of the blanched food in acidified aqueous solutions; (3) direct batch acidification by adding a known amount of an acid solution to a specified amount of food; (4) direct addition of a predetermined amount of acid to individual containers during production; and (5) addition of acids foods to low-acid foods in controlled proportions to conform to specific formulations.

When meat, poultry, or textured protein is a component of acidified foods it acts as a buffer and raises the pH of the product. At a higher pH the growth of bacteria is favored. In addition, the internal pH of pieces of textured protein, meat, or poultry, can have a center pH greater than that of the food product as a whole, thus providing an environment favoring bacterial growth. Therefore, to insure product safety and stability it must be permitted to equilibrate to assure that a low center pH has been achieved for all discrete food pieces.

U.S. Pat. No. 3,886,296 of Brooks et al., issued May 27, 1975, discloses a hot acid blanching process for canning foods wherein the food particles are blanched with a hot acid solution at a temperature of 71° C. to 100° C. to a pH of 5.0, immediately thereafter submersed totally within a liquid phase having a pH below 4.5, and heat sterilized. The pH of the food particles is decreased to 4.5 usually within 30 minutes after the food particles and liquid phase are combined and sealed in a container. The pH of the food is measured on the total product in comminuted form. However, it has been found that for products containing textured protein, as the pH is decreased, the textured protein begins to acquire a sharp, sour, astringent flavor, presumably due to some chemical change in the material. Thus, acidification can have a detrimental effect on protein flavor. In addition, if ground meat or poultry is acidified to below about 4.8 prior to its combination with a liquid or sauce phase the meat becomes discolored and disintegrated. Acid blanching causes destruction of cellular integrity, and meat or poultry becomes soft or mushy in texture at a pH below about 4.8. Acidification can also have an adverse effect on the texture of protein. Acidification of textured protein can cause it to disintegrate by decreasing the functionality of the binder employed. As pH decreases, binding generally decreases. Texture and flavor of the meat, poultry, or protein pieces is critical to product quality and acceptance. A process for acidification of food products containing significant amounts of textured protein which rigorously protects product safety, while having a minimal impact on product flavor and texture is needed.

U.S. Pat. No. 3,736,148 of Katz, issued May 29, 1973, discloses meat analogs resistant to microbiological spoilage having a pH between 3.0 and 5.4 and a water activity of below 0.95. Katz restricts the water level of the analogs as an aid in preventing the growth of microorganisms. Restriction of water activity limits the optimum texture and flavor which can be achieved. The Katz analogs contain preservatives and texture modifiers such as starches, gums, and the like. Products without food additives such as preservatives and texture modifiers are preferred by consumers. It is desirable to have textured protein products which do not contain preservatives and texture modifiers that are microbiologically safe without restriction of the water activity in order to optimize texture and flavor.

British Pat. No. 1,503,420 discloses a low-temperature protein extrusion process followed by washing with an aqueous solvent. The process yields a textured protein concentrate of meat-like texture by extracting water-soluble constituents from a protein extrudate having a density of 85 to 150 g./l. after drying to less than 8% moisture, using an aqueous solvent at a pH of 5.5 to 6.0 and a temperature above 65° C. However, if the aqueous solvent has a pH of less than 5.5 the product generated is tough, chewy, and too dry, according to Table II on page 6 of the patent.

A process has now been found for acidification of a product containing textured protein. Disintegration of the protein particles is avoided and an optimum texture is provided. No increase in sour flavor occurs despite the decrease in pH. Removal of the acid from the protein minimizes the added anion level in the protein to minimize sour flavor without materially affecting the lowered pH and product safety. Thus, a microbiologically safe product containing textured protein or analog having a desirable texture and acceptable flavor can be generated by this acidification process.

It is therefore an object of this invention to provide a process for the preparation of an acidified protein extrudate, acidified analog, and acidified sauce products containing textured protein without disintegration of the protein.

It is a further object of this invention to provide a process for the preparation of an acidified protein extrudate, acidified analog and acidified sauce products containing textured protein of low pH with an acceptable flavor.

It is a further object of this invention to provide a process which renders a food product having a pH less than 4.6 and containing high levels of textured protein bacteriologically safe and shelf-stable.

It is a further object of this invention to provide an acidified protein extrudate, analog, or sauce product prepared according to the process defined herein.

These and other objects of the invention will become obvious from the following descriptions and examples.

DISCLOSURE OF THE INVENTION

This invention relates to a process for the preparation of an acidified sauce product containing textured protein simulating loose cooked ground meat comprising: (a) adding an edible acid to a protein extrudate having at least about 25% protein to lower the pH to between about 3.8 and about 5.5; (b) separating the acid and the protein extrudate; (c) adding a proteinaceous binder to the acidified protein extrudate to effect agglomeration; (d) heat-setting the agglomerated acidified textured protein extrudate to form an analog; (e) combining the analog with a sauce; (f) heating the product to sterilize it; and (g) equilibrating the sauce product until the pH is less than 4.6. Preferably, separation of the acid in step (b) is followed by water washing of the extrudate. This invention further relates to a process for preparing an acidified extrudate comprising steps (a) and (b) above followed by drying or freezing the extrudate. This invention further relates to a process for preparing an acidified analog simulating loose cooked ground meat comprising steps (a) through (d) above, followed by freezing of the analog. This invention additionally comprises the acidified protein extrudate and analog, as well as sauce products containing acidified textured protein or analog simulating loose, cooked ground meat prepared according to the above process.

DESCRIPTION OF PREFERRED EMBODIMENTS

This invention comprises an acidification process for the preparation of an improved textured protein, analog, or sauce product containing acidified textured protein or analog and the products produced thereby.

The term "sauce product" as used herein includes meat-type sauces such as spaghetti sauces, taco sauces, barbecue sauces, chili sauces, and the like, which contain textured protein, analog, a mixture of meat and textured protein, or a mixture of meat and analog. The textured protein or analog simulates loose cooked ground meat.

The term "textured protein" includes all textured protein materials well known in the art, as well as textured single-cell proteins. Mixtures of textured vegetable protein or textured single-cell protein with up to about 90%, but preferably less than about 50% of materials of animal origin, including egg albumen, meat, meat juices, chicken, fish, serum blood, meat by-products, hydrolyzed animal protein, and the like, are also included. The textured protein material preferably contains at least about 25% by weight protein. The textured protein is most preferably a textured vegetable protein. The textured protein is present in the sauce product at levels of from about 1% to about 25% by weight. Preferably, the textured protein is present at a level of from about 2% to about 20% by weight of the product.

The term "analog" as used herein denotes protein which has been texturized, such as by extrusion cooking, comminuted, mixed with some or all of the following: seasonings, spices, colorants, other proteins, binder, water, and fat, and then heatset, and sized to a suitable particle size. The analog is present in the sauce product at levels of from about 5% to about 70% by weight. Preferably, the analog is present at a level of from about 10% to about 50% by weight of the product.

The term "screened sauce" denotes the sauce product of the present invention with the textured protein and any other large particles removed by filtration through a screen, i.e., the filtrate. The screen size preferably employed is U.S. Mesh 10.

The term "screened analog" as used herein denotes the textured protein or analog and any other large particles removed from the product of the present invention by filtration through a screen. The screen size preferably employed is U.S. Mesh 10.

The term "macerated analog" is used herein to denote screened analog that has been comminuted.

The term "center pH" or "internal pH" as used herein denotes the pH of the center of discrete pieces of food. The pH of a minimum of 15 pieces are analyzed and averaged.

The term "equilibration pH" as used herein denotes a center pH of less than 4.6 for the discrete food pieces in a particular product.

The term "water activity" or "$a_w$" is used herein to mean the ratio of the fugacity of water in the system being studied to the fugacity of pure water at the same temperature and pressure. The water activity of the compositions herein can be measured using well-known physical chemical techniques and commercially available instruments.

It has been found that acidification of products containing textured protein can be achieved without destruction of binder utility and without increasing the sour flavor of the resulting product. This is achieved by acid blanching of the protein extrudate, preferably followed by washing the extrudate with water. The washing removes any residual acid which contributes to sour flavor while substantially retaining the low pH necessary for the safety of the product.

PROCESS

The process of the present invention for preparing a shelf-stable acidified sauce product containing textured protein or analog comprises: (a) adding an edible acid to protein extrudate having at least about 25% protein to lower the pH to between about 3.8 and about 5.5; (b) separating the acid and the protein extrudate; (c) adding a proteinaceous binder to the acidified protein extrudate to effect agglomeration, (d) heatsetting the agglomerated acidified textured protein extrudate to form an analog; (e) combining the analog with a sauce; (f) heating the combination to sterilize; and (g) equilibrating the sauce mixture until the pH is less than about 4.6. Preferably, separation of the acid in step (b) is followed by water washing of the extrudate. A process for the preparation of acidified extrudate comprises steps (a) and (b) above followed by drying or freezing. A process for the preparation of acidified analog comprises step (a) through (d) above followed by freezing.

In the process of the present invention the protein is extrusion cooked prior to acidification. Several techniques for extrusion cooking are known in the art. Fat, flavors, seasonings, spices, and color, can be added during extrusion cooking, or mixed with the protein after cooking in combination with water, and binder proteins. The binder is most preferably added after, and not prior to, the extrusion cooking step to preserve its functionality necessary for cross-linking with the extrudate mixture during heatsetting. After extrusion the textured protein component can then optionally be mixed with meat, preferably in ground or chunk form. Preferably, the extrusion is at conditions of temperature and pressure at which water vaporizes. This results in an expanded porous structure necessary for optimum texture. If extruded under different conditions, the extrudate will have a dense structure that is less porous.

The first step of the process of the present invention comprises contacting the protein component with acid by adding an edible acid to the protein to lower the pH to between about 3.8 and about 5.5, preferably about 3.8 to about 4.8, most preferably about 3.9 to about 4.3. Any edible organic or inorganic acid is suitable, but inorganic acids are preferred. These include phosphoric, hydrochloric, carbonic, sodium hydrogen phosphate, anhydric chloric acid, and the like. The acid can be diluted with water and used to hydrate the protein, or the acid can be mixed with the protein after hydration. The water can be distilled, deionized, or tap water. Preferably, it is distilled or deionized.

The acidification is accomplished by any suitable technique such that the acid is in contact with the protein extrudate. These techniques include immersion of the extrudate in an acidic solution, pouring acid onto the extrudate and other suitable techniques. Preferably, the extrudate is acidified by means of blanching with an aqueous acid solution. The extrudate and acid are preferably agitated during contact using a Hamilton kettle, ribbon blender, or other suitable mixer which avoids excessive shredding of the extrudate. The ratio of acid solution to protein can vary from about 1:3 to about 1:40, although any suitable ratio can be employed as long as the desired pH is achieved. The concentration of the acid solution employed can vary, but preferably is less than about 0.5% by weight. The acid concentration is adjusted depending upon the ratio of water to protein. The temperature of the acid solution should be from about 65° C. to about 98° C. for this process, preferably from about 80° C. to about 95° C. It is important that the extrudate not be heated above 99° C. since this causes the extrudate to assume a soft, mushy texture.

In the second step of the process of the present invention the acidified extrudate is separated from any excess acid. The acid and extrudate are separated by any suitable means, such as by draining, screening, centrifuging, pressing, and the like. The pH of the protein after removal of the acid solution is from about 3.8 to about 5.5, preferably from about 3.8 to about 4.8, most preferably from about 3.9 to about 4.3. Removal of the acid aids in reducing sour flavor in the extrudate. The added anion level in the protein is minimized without materially affecting its lowered pH. Removal of the acid from the surface of the extrudate also provides a texture advantage because it minimizes the adverse effect acid has on binder functionality. The protein can be texturized or thermally set before the binder and acid react. Thus, improved binding results in protein of better texture.

Preferably, the acidified extrudate is then subjected to water washing to remove any acid remaining on the extrudate surface. The mechanical action of the water-washing process increases the protein concentration by removal of the water-soluble materials such as soy off-flavors, sugars, and acid. The protein concentration of the extrudate after water-washing is at least 70% on a dry basis, generally is about 80%. The water can be distilled, deionized or tap water; distilled or deionized water is preferred. Edible inorganic salts, preferably calcium salts, such as calcium chloride, can also be added to the water. Calcium and magnesium salts change the hydration properties of the protein. A ratio of from about 1:3 to about 1:40 parts of extrudate solids to parts of water is used, preferably from about 1:10 to about 1:20, more preferably from about 1:10 to about 1:15.

The water-washing is preferably accomplished in a continuous countercurrent extraction or in a multi-stage process, either using countercurrent extraction or by adding water, draining, and adding fresh water for a number of times. During the water-washing the extrudate and the water are mixed using a Hamilton Kettle, ribbon blender, or other conventional mixer which avoids excessive shredding of the extrudate. As in the acidification step, the temperature of the extrudate cannot exceed 99° C. The water temperature should be from about 65° C. to about 98° C., preferably from about 80° C. to about 95° C.

To show the criticality of the temperature of the acid solution or water, one sample of extrudate was soaked in water at about 90° C. for 4 hours and a second sample was boiled at 100° C. for about 1 minute. The physical appearance of the two products was identical. However, the extrudate held at 100° C. was considerably softer and mushy in eating quality. This change is evidenced by the shear press value as measured using a Kramer cell in a Texture Testing System from Food Technology Corporation. The 90° C. extrudate had a shear press value of 230 units, while at 100° C. extrudate had a shear press value of 170 units. The higher the shear press value the tougher the product.

After the water-washing step, the extrudate is centrifuged or pressed to remove the excess water. The water-washed extrudate achieves a constant water weight of about 70% to 88%. This represents the percentage of water needed to fully hydrate the protein extrudate.

If desired, the acidified extrudate of step (b) can be preserved and used as an ingredient in other products. Preservation can be by any suitable means, such as by freezing, drying or canning.

In the third step of the process of the present invention the acidified protein is combined with a proteinaceous binder to effect agglomeration. The acidified protein is preferably subjected to an agglomeration process, in which large particles are made from smaller ones by mixing or coating the smaller particles with any of a variety of proteinaceous binders known in the art, along with colors and flavors, if desired, and heatsetting the binder. Suitable binders include egg white, soy protein fractions, cottonseed proteins, and the like.

The preferred binder is egg white. In the analog and sauce products of the present invention, the binding functionality is affected by pH. As pH is decreased by acidification, binding also decreases and higher levels of egg white are required. For example, if the textured protein is acidified to a pH of from about 3.8 to about 4.6, the amount of egg white needed for effective binding is from about 6% to about 12% by weight of the agglomerated textured protein. If the textured protein is acidified to a pH of from about 4.6 to about 5.5, the amount of egg white needed for effective binding is from about 3% to about 6% by weight of the agglomerated textured protein. Removal of the acid by washing minimizes the level of egg white needed to achieve effective binding.

Any method of heatsetting textured protein known in the art can be employed in the fourth step of the process of the present invention, such as frying, baking, heating with microwave or radiant heat, and the like. Preferred is heatsetting in the presence of oil. The heatsetting can be either a batch or continuous process. Typical batch methods include skillet or grill frying in the presence of oil. Continuous frying methods can include techniques whereby the agglomerated texturized protein is distributed along an endless belt which is immersed in heated frying oil for at least a portion of its travel, prior to removal of the fried analog particles. Batch frying temperatures start at about 127° C. and drop thereafter, due to evaporative cooling, to as low as 104° C. In a continuous immersion frying technique, temperatures of from about 104° C. to about 177° C. can be employed. The fried or heat analog contains pieces of various diameters. The size of the pieces is not limited. For example, pieces having diameters of about 0.75 inch (1.91 cm), about 1 inch (2.54 cm), or about 1.5 inches (3.81 cm), are suitable for use in the present invention.

The acidified analog of step (d) can be preserved and used as an ingredient in other products. Preservation can be by any suitable means, preferably by freezing or drying.

The fifth step of the process of the present invention comprises combining the heatset acidified textured protein or analog with a sauce having a maximum pH of about 4.5. The sauce component of the product can be sterilized prior to its combination with the acidified analog component if necessary. If the equilibrium pH of the sauce and acidified analog is less than 4.2, prior sterilization is not required. If the pH of the sauce is 4.2 or greater, the sauce can be sterilized by any of the techniques known in the art such as high-temperature short-time sterilization.

In the sixth step of the process of the present invention the combined analog and sauce components are heated to destroy the vegetative cells of microorganisms of public health significance and those of nonhealth significance capable of reproducing in the product. For example, the product can be held at a temperature of from about 180° F. (82° C.) to about 220° F. (104° C.) for about 20 minutes. This destroys any acid-tolerant microorganisms and renders the product sterile. The food product is then packed in hermetically sealed containers, preferably by a hot-fill-hold technique. While "hermetically sealed containers" is usually used to refer to jars and cans, it can be appreciated that newer aseptic packages, such as plastic and foil plastic laminate pouches, can also be adapted to this process. In hot-fill-hold processing the container is filled with product at a temperature of at least about 180° F. (82° C.) and held for about 2 to 5 minutes, preferably about 3 minutes, before cooling.

After the container is sealed it is important that portions of the container not contacted by products be heated to the same temperature as the product. For example, if jars are filled with product, a post-capping hot water spray directed at the lid and headspace of the jar can be used to provide for lid and headspace heating. The product is then cooled to storage temperatures for pH equilibration.

The final step of the process of the present invention is equilibrating the product until the pH is less than 4.6 in all parts of the product. Equilibration is continued until the total product pH and the center pH of each analog piece are less than 4.6. In the present invention the preferred equilibrium pH for the sauce product is from about 4.0 to about 4.5, most preferably from about 4.20 to about 4.4. Protein extruded at a combination of temperature and pressure under which water vaporizes has an expanded porous structure. The diffusion mobility of the hydrogen ion is greater in a porous than in a dense structure. The particle size determines the diffusion path length of the hydrogen ion. Thus the particle size and porosity can be optimized to decrease the time required for pH equilibration. In the process of the present invention, pieces having a diameter of about ¾ inch (1.91 cm.) will equilibrate to a center pH of 4.6 or less in about 24 to 48 hours when stored at ambient conditions.

The sauce product produced by the process of the present invention comprises a shelf-stable sauce product having an equilibrium pH of less than about 4.6 and containing textured protein or analog at a level greater than 5% by weight. The analog is present at a level of from about 5% to about 70% by weight, preferably from about 10% to about 50% by weight of the total product. Preferably, the equilibrium pH is from about 4.0 to about 4.5. The analog has an optimum flavor and texture, and has a maximum water activity of about 0.96 or greater.

The sauce product contains analog which is less porous and less likely to disintegrate than meat or poultry. Thus, in contrast to the adverse effect of acidification on meat or poultry of yielding a soft mushy texture, acidification of analog yields a desirable firm texture. Ground beef acidified according to the above process to a pH of 4.8 approaches the beef's isoelectric point and the meat disintegrates into smaller pieces with reduced diameter. It becomes soft or mushy in texture, appears gray, and develops a bad taste. The screened analog of the product of the present invention at pH less than 4.6 does not disintegrate into small pieces and become soft or mushy.

An additional benefit of this invention is that there is no increase in sour flavor display when the acidification process is employed. It is known that as pH is decreased due to acidification, tartness or sourness of flavor increases. With the use of the process of the present invention the pH of the final product can be lowered to less than 4.50 and still result in product that is not unacceptably sour. For the sauce product of this invention it is most preferred that the final product equilibrium pH be 4.2 to 4.4.

The extrudate, analog, and sauce products of the present invention have a water activity of about 0.96 or greater. Typically, the water activity is between 0.96 and 1.00. Complete hydration of the textured protein is necessary to optimize product flavor and texture. Restriction of the water level in the product decreases flavor and adversely affects texture.

It has been determined that keeping the pH between 4.4 and 4.6, while effective to prevent development of *Clostridium botulinum,* is insufficient to prevent development of flat sour spoilage, caused by activity of *Bacillus coagulans.* In addition to acidification to a particular pH range, a minimum organic acid level is required for control of the latter microorganisms. An organic acid level of at least 0.4% organic acid expressed as anhydrous citric acid is required for long-term shelf stability.

In general, any food-compatible acid, or combination of food-compatible organic and inorganic acids, is acceptable for lowering the pH. Edible organic acids which can be used herein include fumaric, citric, malic, acetic, lactic, propanoic, adipic, tartaric, succinic, and the like. A certain level of inorganic acids may also be used for lowering the pH. These acids are not counted in the organic acid level. These include phosphoric, carbonic, sodium hydrogen phosphate, anhydric chloric acid, and the like. Within the pH limit of the organic acid level, certain acids and combination of acids will provide more acceptable flavor, depending upon the product being formulated. For example, acidification with citric acid provides more sourness and sharpness than acidification with hydrochloric acid at a given pH. Acetic acid can add a vinegary flavor to foods.

Determination of the specific pH and organic acid level of any particular product can readily be done by standard analytical techniques described hereinafter. Alternatively, the organic acid level can be calculated in advance by adding together the organic acid contents of each of the ingredients of the food product, along with any organic acids added as part of the formulation. Acid can be added as needed or excess acid can be neutralized as required to obtain the desired pH.

It can be appreciated that still other executions of this invention can be devised without departing from its scope and spirit and without losing its advantages. Minor processing parameters and product ingredients can be altered without departing from the scope of the invention. In particular, acidification of the protein, followed by water washing, however practiced, promotes product safety, and results in product of improved texture and flavor.

TESTING METHODS FOR pH

The analog was separated from any sauce present by pouring the product through a 0.500 inch screen. The contents of the screen were drained and blotted with a paper towel to remove free sauce. An individual analog chunk was then placed at 25° C. onto a Microelectrode Model Ml-410 Combination Electrode available from Microelectrodes, Inc., Londonderry, NH 03053. The pH was read after one minute. The pH of a minimum of 15 analog chunks was determined and averaged with calibration of the electrode after every 5 readings.

pH was also separately determined for the screened sauce and total macerated product using standard methods, as defined in 21 CFR 114.90, the disclosure of which is fully herein incorporated by reference.

EXAMPLE 1

Example 1 illustrates the preparation of analog using the process of the present invention. A protein mix was prepared according to the following formula:

| Ingredient | % By Weight |
| --- | --- |
| Promosoy 100 (soybean concentrate available from Central Soya) | 77.0 |
| Egg white solids | 7.6 |
| Starch | 6.5 |
| Calcium chloride dihydrate | 0.4 |
| Calcium caseinate | 7.5 |
| Color | 1.0 |
| | 100.0 |

The above dry protein mix was mixed and placed in a feeder of a specially modified Wenger-X-20 extrusion system having five temperature zones. The system was modified to control the temperature in the final three zones within ±10% of the set temperature. In addition, the water injection system was modified to carefully control the flow of the water into the extrusion system and into the mixing cylinder.

The dry components were separately weighed and mixed in a ribbon blender. This premix was then placed in the extruder hopper and automatically conveyed through a mixing cylinder on a continuous basis. Water was injected at the rate of 0.60 lbs./min. and steam was added at a rate of 0.20 lbs./min. in the mixing cylinder. This resultant wet protein mix contained about 32% water.

The proteinaceous composition was then fed into the extrusion barrel at the rate of about 2.8 lbs./min. Each of the zones is equipped with a spiral auger. The pressure in the fourth temperature zone ranged from 70–130 psi, and the fifth or last temperature zone was about 300 psi. The augers are operated at about 450 rpm. The energy input was about 85 watt hrs./lb. of protein in the extrudate (about 50 watt hrs./lb. of protein mix).

The protein composition was passed through a die plate containing 36 orifices, each with a diameter of 2 mm. The temperature and pressure change across the die plate caused the extruded material to expand to a diameter about twice the size of the die orifice. The temperature of the extrudate was about 175° C.

The puffed extrudate was cut into strands approximately 1.5 inches in length at the die face, and tempered for about 30 seconds as it was automatically conveyed to a grinder where it was reduced in size under 0.375 inch in length. The resulting material contained about 25% water.

The extrudate was rod-like, rehydrated rapidly, and was elastic as opposed to tough in texture. The matrix had a large number of layers which were easily separated from each other. The layers were composed of random length thin fibers.

Forty-three pounds of the extrudate were mixed with 240 pounds of distilled water at about 90° C. in a 50-gallon Hamilton kettle. The water and extrudate were mixed for about 30 minutes, the water drained, and fresh water added. This process was repeated four times. During the fifth wash 457 g. of 75% phosphoric acid was added to the 240 pounds of distilled water. The acid solution and extrudate were mixed for about 30 minutes. The pH was 4.28. The solution was drained and fresh water added. A final wash was completed in the same manner as the first four washes.

The washed extrudate was centrifuged to remove the excess water. The water content of the now fully hydrated extrudate was about 82%. The water-washed extrudate was flatter, less rod-like in appearance than the starting extrudate, and had a pH of about 4.4. The layering remained essentially unchanged. The hydrated extrudate had a bland flavor.

An agglomerate was prepared according to the following formula:

| Ingredient | % By Weight |
| --- | --- |
| Water-washed extrudate at 82% H$_2$O | 87.7 |
| Dried egg whites | 0.7 |
| Calcium caseinate | 0.9 |
| Flavor | 1.87 |
| Micronutrients | .03 |
| Distilled water | 8.8 |
| | 100.0 |

All of the above ingredients except the washed extrudate were mixed together to form an aqueous binder system. The binder was added to the washed fully hydrated extrudate and mixed in a Hobart mixer until the product was homogenized.

The agglomerate had a matted, flat appearance. The layering and binding of the layers within the granules remained about the same as the extrudate.

The fully hydrated extrudate/binder mixture was then heat-set to form an analog and dried by placing the mixture in a two-stage belt dryer and dried at 210° F. for 20 minutes in the first stage, and 190° F. for 35 minutes in the second stage. A dry analog was formed.

The dried analog was more matted in appearance but the granules were bound together to make chunks similar in appearance to browned ground beef. The degree of layering within the granules was less but the separation of the layers remained about the same.

Finished product analog was produced by applying two fat coatings to the surface of the agglomerate in a rotating drum. The first fat coating was molten vegetable fat. The second fat coating was Crisco Oil ® containing meat flavor materials.

This product can be rehydrated for use in gravies, spaghetti, etc. by boiling it in water for 20 to 30 minutes. The product resembles ground beef in texture, appearance and eating quality.

When a continuous countercurrent extraction process using water at about 90° C. and a water-to-extrudate solids ratio of 10:1 to 15:1 is used to replace the multi-stage washing step, similar results are obtained.

EXAMPLE 2

Example 2 illustrates the preparation of a spaghetti sauce product which has acceptable flavor using analog prepared as in Example 1. A spaghetti sauce product was prepared according to the following formula:

| Ingredient | Weight Percent |
| --- | --- |
| Tomato paste | 38.44 |
| Spices and seasonings | 5.98 |
| Oil | 4.48 |
| Citric Acid | 0.11 |
| Water | 36.51 |
| Meat analog (hydrated) | 14.48 |

The tomatoes, spices and seasonings, citric acid, oil, and water, were combined in a 50 gallon Hamilton Kettle with a steam-heated jacket and heated to about 120° F. (49° C.) to about 140° F. (60° C.) with agitation over a period of about 2 hours. The pH of the mixture was adjusted to about 4.2. The mixture was then heated to 160° F. (71° C.), and thermally processed by passing through a Crepaco VT460 swept surface heat exchanger to achieve high-temperature-short-time commercial sterilization. The temperature was raised to 255° F. (124° C.), maintained for 45 seconds, and then cooled to about 140° F. (60° C.).

The meat analog was hydrated 1.0:2.4 with water and combined with the tomato sauce. The product was heated to about 190° F. (88° C.) in about 25 minutes and held at that temperature for about 20 minutes. The product was then jarred, capped, inverted, and cooled. The equilibrium pH was 4.28.

A leading commercial spaghetti sauce was combined with fried ground beef and cooked according to package directions. The above product and the analog product were tested by a panel of 52 consumers and rated on a scale of 0 to 100 for the following attributes: overall preferance, tomato intensity, spice intensity, oregano intensity, onion intensity, sweetness intensity, sourness intensity, flavor of meat pieces, meat flavor in sauce, meat tenderness, and off flavor. The product containing the acid-washed analog of Example 1 was preferred overall 73 to 27. The analog resembled ground beef in texture, appearance, and eating quality.

EXAMPLE 3

Example 3 illustrates the preparation of a sauce product by the process of the present invention.

A spaghetti sauce was prepared according to the following formula:

| Ingredient | Weight Percent |
| --- | --- |
| Tomatoes | 36.6 |
| Spices and seasonings | 3.4 |
| Citric Acid | 0.1 |
| Oil | 2.6 |
| Meat analog | 20.0 |
| Water | 37.3 |

The tomatoes, spices and seasonings, citric acid, oil, and water, were combined in a 50 gallon Hamilton kettle with a steam-heated jacket and heated to about 120° F. (49° C.) to about 140° F. (60° C.) with agitation over a period of about 2 hours. The pH of the mixture was adjusted to about 4.2. The mixture was then heated to 160° F. (71° C.), and thermally processed by passing through a Crepaco VT460 swept surface heat exchanger to achieve high-temperature-short-time commercial sterilization. The temperature was raised to 255° F. (124° C.), maintained for 45 seconds, and then cooled to about 140° F. (60° C.).

A soy concentrate, manufactured by the A. E. Staley Company, was mixed with water to a moisture level of about 50% and worked to a dough in a Werner & Pfleiderer twin screw extruder in a manner so that strands of extrudate were formed. The dough temperature immediately prior to exit from the extruder was about 170° C. (338° F.) and the pressure was about 600 psig. As the strands of dough exited from the extruder die, they were expanded somewhat by release of steam to a diameter of about 6 mm. The extrudate strands were cut into lengths of about 1.5 cm by a rotary shear. The extrudate was washed with water in a Hamilton kettle under constant agitation for about 30 minutes. The temperature was maintained at from about 65° C. to about 98° C. The water was drained away and the extrudate washed a second time in the same manner. The extrudate was then washed with a solution of phosphoric acid at a minimum concentration of about 0.5% in the same manner. This was followed by a final water wash. The pH of the extrudate was less than 4.75.

The acidified washed extrudate was mixed with dry flavorants and egg white binder until the mixture was homogeneous and little free liquid was apparent. The finished slurry contained by weight about 70% water, 2.2% egg white solids, 3.8% flavorants and the remainder extrudate solids.

The slurry was then formed on a moving continuous belt as a layer about ½ inch thick and about 10 inches wide. This layer was dropped a short distance onto a mesh belt traveling somewhat faster than the forming belt so that partially separated lumps of slurry of various sizes were formed. The moving mesh belt was immersed in the vat of a continuous fryer which contained fat controlled at 130° C. Immersion of the mat was maintained by an upper second belt of like design conveyed at the same speed as the lower belt. The space between the belts was larger than the thickness of the mat.

The analog was fried for about 3.5 minutes. The analog exiting from the fryer was in pieces of various sizes and thicknesses. This analog was then drained free of excess fat and cooled in containers. The pH of the analog was 4.75.

The meat analog component and sauce components were combined and the product heated to about 190° F. (88° C.) in about 25 minutes. The product was then held at about 190° F. (88° C.) for about 20 minutes. Several jars were then filled with product, capped, inverted, and cooled. The equilibrium center pH was 4.56. The analog resembled ground beef in texture, appearance, and eating quality. The product had an acceptable flavor and was not sour.

What is claimed is:

1. A process for preparing an improved shelf-stable sauce product containing a textured protein meat analog comprising:
    (a) contacting an edible acid in aqueous solution with textured protein extrudate prepared by extrusion cooking of a vegetable protein material having at least about 25% protein to lower the pH of said textured protein extrudate to a pH between about 3.8 and about 4.8;
    (b) separating the acid and the acidified textured protein extrudate;
    (c) adding a proteinaceous binder to the acidified textured protein extrudate to effect agglomeration;
    (d) heatsetting the agglomerated acidified textured protein to form a meat analog similar in appearance to cooked ground meat;
    (e) combining the meat analog with a sauce, said sauce having a pH of less than about 4.5;
    (f) heating the sauce product comprising the combination to effect sterilization; and
    (g) equilibrating the pH of the components combined in said sauce until the pH of any portion of said sauce product is less than about 4.6, said pH of 4.6 being achieved within a period of about 48 hours.

2. The process of claim 1 wherein the sauce product further comprises meat as a component.

3. The process of claim 1 wherein the edible acid is an inorganic acid.

4. The process of claim 3 wherein the edible acid is phosphoric acid.

5. The process of claim 1 wherein the acid solution to extrudate weight ratio in step (a) is from about 1:3 to about 1:40.

6. The process of claim 5 wherein the temperature of the acid solution in step (a) is from about 65° C. to about 98° C.

7. The process of claim 6 wherein the extrudate of step (b) after separation of the acid has a pH of from about 3.9 to about 4.3.

8. The process of claim 1 further comprising washing the acidified extrudate of step (b) with water at a temperature of from about 65° C. to aout 98° C. to remove acid.

9. The process of claim 1 further comprising washing the extrudate of step (a) with water at a temperature of from about 65° C. to about 98° C. prior to contacting the extrudate with acid.

10. The process of claim 1 wherein the proteinaceous binder comprises egg white.

11. The process of claim 10 wherein the amount of egg white on a dry solids basis is from about 2% to about 12% by weight of the agglomerated textured protein.

12. The process of claim 1 wherein the meat analog of step (d) is preserved by freezing or drying prior to step (e).

13. The process of claim 12 further comprising washing the acidified extrudate of step (b) with water at a temperature of from about 65° C. to about 98° C. to remove any acid remaining on the extrudate surface.

14. The process of claim 12 further comprising washing the extrudate of step (a) with water at a temperature of from about 65° C. to about 98° C. prior to contacting it with acid.

15. The process of claim 1 wherein the shelf-stable sauce produced has a water activity of at least about 0.96.

16. The process of claim 1 wherein the acidified textured protein extrudate of step (b) is preserved by freezing prior to step (c).

17. The process of claim 16 further comprising washing the acidified extrudate of step (b) with water at a temperature of from about 65° C. to about 98° C. to remove any acid remaining on the extrudate surface prior to freezing.

18. The process of claim 17 further comprising washing the extrudate of step (a) with water at a temperature of from about 65° C. to about 98° C. prior to contacting it with acid.

* * * * *